United States Patent [19]

Yamamoto et al.

[11] Patent Number: 5,633,311

[45] Date of Patent: May 27, 1997

[54] METHOD OF PRODUCING ORGANOPOLYSILOXANES CONTAINING HYDROLYZABLE FUNCTIONAL GROUPS, AND CURABLE RESIN COMPOSITION USING SAID ORGANOPOLYSILOXANES

[75] Inventors: Kenji Yamamoto; Kouichi Tanaka; Yuji Yoshikawa; Masaaki Yamaya, all of Usui-gun, Japan

[73] Assignee: Shin-Etsu Chemical Co., Ltd., Tokyo, Japan

[21] Appl. No.: 498,917

[22] Filed: Jul. 6, 1995

[30] Foreign Application Priority Data

Jul. 6, 1994 [JP] Japan .................................. 6-177524

[51] Int. Cl.⁶ ........................................................ C08G 77/06
[52] U.S. Cl. .............................. 528/14; 528/17; 528/18; 528/12; 528/21
[58] Field of Search ........................... 528/17, 18, 12, 528/14, 21

[56] References Cited

U.S. PATENT DOCUMENTS

| | | | |
|---|---|---|---|
| 2,698,313 | 12/1954 | Daly | 260/45.5 |
| 2,698,314 | 12/1954 | Rust | 260/46.5 |
| 4,368,294 | 1/1983 | Deubzer et al. | 525/100 |
| 4,604,443 | 8/1986 | Chang et al. | 528/28 |

FOREIGN PATENT DOCUMENTS 5-214103  8/1993  Japan .

*Primary Examiner*—Margaret W. Glass
*Attorney, Agent, or Firm*—Millen, White, Zelano, & Branigan, P.C.

[57] ABSTRACT

There is provided a method of producing organopolysiloxanes by using organoalkoxysilanes and/or organoalkoxysiloxanes as starting materials and subjecting them to a hydrolytic condensation reaction, wherein at least 50% by weight of said starting materials is constituted of organoalkoxysilanes and/or organoalkoxysiloxanes represented by an average compositional formula (A):

$$R^1{}_a SiX_b Y_c O_{(4-a-b-c)/2} \qquad (A)$$

wherein $R^1$ groups are the same or different and each of them represents an unsubstituted or substituted alkyl, alkenyl or aryl group, X represents an alkoxy group containing 1 to 10 carbon atoms, Y represents an alkoxy group containing 2 to 10 carbon atoms which is different from the alkoxy group represented by X and has a hydrolysis rate lower than that of X, a is a real number from 0 to 2, b and c are each a real number from 0.1 to 3, provided that $a+b+c \leq 4$.

8 Claims, No Drawings

METHOD OF PRODUCING ORGANOPOLYSILOXANES CONTAINING HYDROLYZABLE FUNCTIONAL GROUPS, AND CURABLE RESIN COMPOSITION USING SAID ORGANOPOLYSILOXANES

FIELD OF THE INVENTION

The present invention relates to organopolysiloxanes and, more particularly, to organopolysiloxanes suitably used for room temperature curable resins, a method of producing them and a curable resin composition using the aforesaid organopolysiloxanes.

BACKGROUND OF THE INVENTION

As industrial production methods of organopolysiloxanes, there have so far been known the method of hydrolyzing organohalosilanes and the method of hydrolyzing organoalkoxysilanes.

The former method in which organohalosilanes are used as starting material has an advantage of simple production process, but involves a disadvantage of failing in ensuring the same composition to organopolysiloxanes every time they are produced since the hydrolytic condensation of halosilanes proceeds at such a high speed as to make the control thereof difficult. In particular, the former method has high possibility of causing gelation or generating microgel when trifunctional or tetrafunctional silanes are used in a large amount with the intention of producing organopolysiloxanes to be used as curable resin. Therefore, that method is far from being a good method.

On the other hand, the latter method in which organoalkoxysilanes containing alkoxy groups as hydrolyzable groups are used is almost free from the foregoing disadvantage since the hydrolysis of organoalkoxysilanes proceeds at lower speed than that of halosilanes. Thus, the latter method enabled for the first time organopolysiloxanes suitable for use as curable resins to be produced in an industrial scale from large amounts of trifunctional and tetrafunctional silanes.

In order to meet a wide variety of performances required of organopolysiloxanes to be used as curable resins, it is important for a method of producing them to ensure a wide range of possibility in designing the product performance as well as the prevention of gelation and microgel generation and the high reproducibility of organopolysiloxanes' performance as the products. In this respect, however, any particular improvements have not yet been introduced in the conventional method using as starting material alkoxysilanes whose alkoxy groups are the same.

Basically important factors in the performance design of organopolysiloxanes to be used as curable resins are the kinds and the contents of functional groups introduced therein and the average molecular weight thereof. These factors have decisive influences upon workability at the time of using curable resins (including a curing speed and a drying time) and performances of the cured matter (including hardness, flexibility, mechanical strength, chemical resistance and so on). Accordingly, it is apparent from the viewpoint of product design that favorable methods are those which not only enable organopolysiloxanes to be designed so as to contain functional groups chosen from a wide variety of species in various contents and have their average molecular weight in a wide range, but also can ensure good reproducibility in production of the intended organopolysiloxanes.

If organohalosilanes are used as starting material, however, it is meaningless to control the content of hydrolyzable functional groups. This is because halogen atoms are unsuitable for the functional groups for curing. If alkoxysilanes are used as starting material, on the other hand, it is possible to control the content of remaining functional groups by adjusting the quantity of water added for hydrolysis. However, the controllable range therein is narrow and the organopolysiloxanes obtained are restricted in their average molecular weight.

Controlling the average molecular weight can be accomplished only by the control of the reaction time in the hydrolysis condensation. On the other hand, the reaction condition including the amount of a hydrolytic condensation catalyst used, the siloxane condensation and the reaction temperature enables the adjustment of the reaction rate in the hydrolysis condensation.

The rate of the hydrolytic condensation reaction is however affected by various factors, and so the accuracy of the average molecular weight control by the reaction time becomes low. In addition, the controllable range is limited since the generation of microgel and the gelation must be avoided. Especially in the case of adopting the method of hydrolyzing organohalosilanes high in hydrolytic condensation rate, the condensation product obtained only can have its average molecular weight within a very limited range even if the reaction condition is changed variously.

On the other hand, the production of organopolysiloxanes from difunctional organosilanes does not encounter the above-described problems, namely the difficulties in controlling the average molecular weight, the microgel generation and the gelation. Such being the case, there was developed the hydrolytic condensation method in which organosilanes were hydrolyzed using a reduced amount of water to increase the proportion of functional groups remaining unhydrolyzed and thereby to liken the resulting silanes to difunctional organosilanes. This method is useful for prevention of microgel generation and gelation, but actually obtained products contain low molecular weight compounds in large quantities. Consequently, the products are liquids low in viscosity and broad in molecular weight distribution, and so they are unsuitable for curable resins.

Thus, the conventional production methods described above are unsatisfactory with respect to the control of both functional group content and average molecular weight, which are basically important factors for the product design of organopolysiloxanes to be used as curable resins.

In general a wide variety of performances are required of organopolysiloxanes for curable resin use. Therefore, there has so far been adopted a means of mixing plural kinds of organoalkoxysilanes and subjecting them to simultaneous hydrolysis condensation. However, the means is unsuccessful in making a mixture of organoalkoxysilanes as a starting material be brought in the organopolysiloxane product as the composition of the starting material is kept. In other words, it fails in production of organopolysiloxanes in accordance with the product design.

In case the starting material comprises tetramethoxysilane and methyltrimethoxysilane which are high in hydrolytic condensation rate, for instance, their hydrolysis condensates are concentrated in a high molecular weight component of the product, thereby deteriorating the storage stability and the pot life of the product. If the starting material comprises dimethyldialkoxysilanes which are comparatively low in hydrolytic condensation rate, on the other hand, their hydrolysis condensates constitute an oil component, and so the product obtained comes to have drawbacks such that it cannot ensure sufficient softness in the high molecular weight component and undergoes deterioration in film forming ability.

With the intention of solving the above-described problems, there has been proposed a method of properly selecting the species of alkoxy groups introduced as hydrolyzable groups into an organosilane to adjust the hydrolysis rate. Specifically, the method consists in selecting an organosilane having a low hydrolytic condensation rate, e.g., tetrabutoxysilane or methyltripropoxysilane, as a starting material, but using neither tetramethoxysilane nor methyltrimethoxysilane which has a high hydrolytic condensation rate.

In case the weight of alkoxy groups forms a large proportion of the molecular weight of a starting material used, as in the above-cited alkoxysilanes, the organopolysiloxanes obtained are decreased in silicon atom content. In particular, disadvantages which the low silicon content entails are serious in the case of using tetrafunctional and trifunctional silanes. Further, starting materials containing alkoxy groups other than methoxy group are expensive, and so they raise the cost of production. Accordingly, such a production method is inadequate for the industrial purpose.

In another method of using dimethyldialkoxysilanes which are comparatively low in hydrolytic condensation rate, methoxy groups are generally used as the alkoxy groups and, as silane compounds having higher hydrolytic condensation rates which are to be used together therewith, it is necessary to choose them from expensive silanes having, e.g., acetoxy, oxime, amino or isopropenoxy groups. Therefore, this method also is unsuitable for an industrial production method.

Thus, there have not yet been found any industrially useful methods capable of solving the aforementioned problems of the simultaneous hydrolysis condensation reaction.

In general, organopolysiloxanes used in a curable resin composition contain hydrolyzable groups, such as alkoxy groups, or silanol groups as functional groups for curing. Since the organopolysiloxanes containing hydrolyzable groups as functional groups are not cross-linked in the absence of water, not only they have high storage stability, but also they require no particular treatment, e.g., heating at a high temperature, for curing because they are cross-linked by absorbing moisture upon exposure to the air. In this respect, such organopolysiloxanes are superior to those containing silanol groups as functional groups. Therefore, they are used as room temperature curable resins for various purposes.

In the organopolysiloxanes used as room temperature curable resins, as described above, the content of functional groups and the average molecular weight are important factors determining the product performance. In addition to these factor, what kinds of functional groups are introduced therein is also important.

More specifically, different kinds of functional groups differ in hydrolytic condensation rate, and so the curability of organopolysiloxanes depends largely upon the kinds of functional groups they contain.

When organopolysiloxanes have too high curability, not only a complicated control is required for preventing them from deteriorating upon storage, but also a serious workability problem is caused, e.g., due to an increase in viscosity or gelation during mixing with other ingredients and painting or coating operation.

When they have too low curability, on the other hand, the coatings thereof are inferior in drying speed and requires a long time for curing. Therefore, they are at a disadvantage from an industrial point of view.

As another reason why the kinds of functional groups are important, there can be adduced a fact that functional groups remain in the cured matter and the properties of the cured matter are influenced by the kinds of the functional groups remaining therein.

For instance, if alkyl moiety-containing functional groups remain in cured matter, water repellency and staining resistance are imparted to the cured matter. If nitrogen-containing functional groups remain in cured matter, they can sometime enhance adhesion or adhering properties of the cured matter to a substrate or confer antistatic properties on the cured matter.

If functional groups remain in cured matter in excess of necessity, however, they have bad influences on water resistance and weather resistance of the cured matter.

In producing organopolysiloxanes used as room temperature curable resins, therefore, it is desirable to adopt a production method which allows a free choice also in the kind of functional groups. The production method which is at an advantage in this point comprises two steps such that organopolysiloxanes containing silanol groups are firstly produced and then, in the presence or absence of a catalyst, the silanol groups are reacted with one or more compounds chosen from a group consisting of alcohols, carboxylic acids, oximes and organosilanes containing at least two hydrolyzable groups such as alkoxy groups, carboxyl groups, oxime groups, etc. so that the desired functional groups may be introduced in the organopolysiloxanes, thereby achieving the introduction of hydrolyzable groups.

However, the method described above has high possibility of causing gelation, microgel generation or increase in viscosity during reaction, because the condensation of silanol groups also proceeds therein.

In order to remove such drawbacks from the foregoing method, it is possible to add excessive amounts of alcohols, carboxylic acids, oximes and organosilanes containing at least two hydrolyzable groups, but an additional step for removing the organosilanes added in excess becomes necessary. Therefore, such a modification is at a disadvantage in production cost.

If the organosilanes added in excess cannot be removed, on the other hand, they exert unfavorable influences upon the properties of cured matter.

In case the gelation, microgel generation and the increase in viscosity are prevented by adopting a mild reaction condition, unreacted silanol groups remain to deteriorate the storage stability.

As still another method for producing organopolysiloxanes used as room temperature curable resin, there is known a method of using organoalkoxysilanes as a starting material and performing hydrolytic condensation under a condition that a sufficient proportion of the alkoxy groups may remain as functional group. Such a method, however, can allow a limited choice in the species of alkoxy group.

Further, the above-described two methods for production of organopolysiloxanes used as room temperature curable resin have also a drawback to the important factor pointed out hereinbefore, that is, the control of the content of functional groups and the average molecular weight. Thus, it can be said that no methods effective for solving the aforementioned problems have yet been proposed.

SUMMARY OF THE INVENTION

As a result of our intensive studies of the aforesaid problems, it has been found that a satisfactory settlement can be obtained when an organoalkoxysilane containing at least two alkoxy groups different from each other in hydrolysis speed and/or an organoalkoxysiloxane containing at least two alkoxy groups different from each other in hydrolysis speed is used as a starting material, thereby achieving the present invention.

Therefore, a first object of the present invention is to provide an organopolysiloxanes suitable for curable resins.

A second object of the present invention is to provide a method of producing organopolysiloxanes which not only can prevent the gelation and the microgel generation, but also can ensure high reproducibility of the intended products and a wide range of possibility in designing the product performance.

A third object of the present invention is to provide a curable resin composition which can ensure good workability and form a cured resin having excellent physical properties.

The above-described objects of the invention are attained by a method of producing organopolysiloxanes by using organoalkoxysilanes and/or organoalkoxysiloxanes as starting materials and subjecting them to a hydrolytic condensation reaction, wherein at least 50% by weight of the starting materials are constituted of organoalkoxysilanes and/or organoalkoxysiloxanes represented by an average compositional formula, $R^1{}_a SiX_b Y_c O_{(4-a-b-c)/2}$, wherein $R^1$ groups are the same or different and each of them represents an unsubstituted or substituted alkyl, alkenyl or aryl group; X represents an alkoxy group containing 1 to 10 carbon atoms; Y represents an alkoxy group containing 2 to 10 carbon atoms which is different from the alkoxy group represented by X and has a hydrolysis rate lower than that of X; a is a real number from 0 to 2, b and c are each a real number from 0.1 to 3, provided that $a+b+c \leq 4$.

In accordance with the present method, the organopolysiloxanes produced have a low degree of dispersion with respect to the molecular weights and are reduced in content of a high molecular weight component subject to an increase in viscosity and gelation. Therefore, the curable resin composition containing the present organopolysiloxanes as a main component can secure improved storage stability and workability, and the present method makes it easy to introduce curing functional groups high in hydrolyzability into organopolysiloxanes.

Further, the present method not only uses inexpensive starting materials, but also enables arbitrary and easy control of the hydrolytic condensation rate. Accordingly, the present invention is very useful for the industrial production of organopolysiloxanes.

DETAILED DESCRIPTION OF THE INVENTION

In the compositional formula representing organoalkoxysilanes and/or organoalkoxysiloxanes, examples of $R^1$ include a methyl group, an ethyl group, a propyl group, a butyl group, a vinyl group, an acryloxyalkyl group, a methacryloxyalkyl group, a phenyl group, a benzyl group, a fluoroalkyl group, a chloroalkyl group, a glycidoalkyl group, an aminoalkyl group, and a mercaptoalkyl group.

X represents an alkoxy group having a comparatively high hydrolysis rate, such as methoxy, ethoxy, propoxy or the like. In particular, a methoxy group is preferred as X.

Y represents an alkoxy group lower in hydrolysis rate than X, including an alkoxy group containing more carbon atoms than X and an alkoxy group derived from a secondary or tertiary alcohol. As examples of such groups, mention may be made of isopropoxy, butoxy, tert-butoxy, pentanoxy and hexanoxy groups.

Specific examples of organoalkoxysilanes and/or organoalkoxysiloxanes represented by the foregoing average compositional formula include those illustrated below:

$Si(OC_3H_7)(OCH_3)_3$,
$Si(OC_3H_7)_2(OCH_3)_2$,
$Si(OC_4H_9)(OCH_3)_3$,
$Si(OC_4H_9)_2(OCH_3)_2$,
$Si(OC_3H_7)(OC_2H_5)_3$,
$Si(OC_3H_7)_2(OC_2H_5)_2$,
$Si(OC_4H_9)(OC_2H_5)_3$,
$Si(OC_4H_9)_2(OC_2H_5)_2$,
$(CH_3O)_2(C_3H_7O)SiOSi(OCH_3)_2(OC_3H_7)$,
$(CH_3O)(C_3H_7O)_2SiOSi(OCH_3)(OC_3H_7)_2$,
$(CH_3O)_2(C_3H_7O)SiOSi(OCH_3)(OC_3H_7)OSi(OC_4H_9)(OCH_3)_2$,
$(CH_3)Si(OC_3H_7)(OCH_3)_2$,
$(CH_3)Si(OC_3H_7)_2(OCH_3)_2$,
$(CH_3)Si(OC_4H_9)(OCH_3)_2$,
$(CH_3)Si(OC_4H_9)_2(OCH_3)$,
$(CH_3)Si(OC_3H_7)(OCH_3)O(CH_3)Si(OC_3H_7)(OCH_3)$,
$(CH_3)Si(OCH_3)(OC_3H_7)O(CH_3)Si(OC_3H_7)O(CH_3)Si(OCH_3)_2(OC_3H_7)$,
$(CH_3)Si(OCH_3)(OC_4H_9)O(CH_3)Si(OCH_3)O(CH_3)Si(OCH_3)_2(OC_4H_9)$,
$(CH_3)_2Si(OCH_3)(OC_3H_7)$,
$(CH_3)_2Si(OCH_3)(OC_4H_9)$,
$(C_6H_5)Si(OC_3H_7)(OCH_3)_2$,
$(C_6H_5)Si(OC_4H_9)(OCH_3)_2$,
$(C_6H_5)Si(OC_3H_7)(OCH_3)O(C_6H_5)Si(OC_3H_7)(OCH_3)$,
$(C_6H_5)Si(OC_3H_7)(OCH_3)O(C_6H_5)Si(OCH_3)O(C_6H_5)Si(OC_3H_7)(OCH_3)$.

Although commercial products may be available to such organoalkoxysilanes and organoalkoxysiloxanes as cited above, which each contain at least two different hydrolyzable groups in one molecule, they are generally expensive and limited in the choice of species and contents of hydrolyzable groups.

In the case where purities as high as those of commercial products are not required, it is appropriate to prepare the intended organoalkoxysilanes and/or organoalkoxysiloxanes from an organoalkoxysilane and/or an organoalkoxysiloxane which contains the same kind of alkoxy groups and is therefore obtained with ease by taking advantage of an ester exchange reaction. The ester exchange reaction can be easily performed as a preprocess of the organopolysiloxane production so far as there is used an apparatus of the type which enables organopolylsiloxanes to be produced by hydrolytic condensation reaction. Accordingly, the aforesaid method is advantageous from an industrial point of view.

For instance, a widely used material, such as methyltrimethoxysilane or tetramethoxysilane, in an amount of 1 mole is mixed with two moles of butanol and allowed to react therewith at a temperature of 0° to 100° C. in the presence of a catalyst, e.g., an acid such as hydrochloric acid, sulfuric acid, phosphoric acid, paratoluenesulfonic acid, trifluoroacetic acid, etc., a base such as NaOH, KOH, amines, ammonium hydroxide, etc., or an organometallic compound such as an alkyl titanate, organotin, etc., thereby easily preparing methyldimethoxybutoxysilane, methylmethoxydibutoxysilane, trimethoxybutoxysilane, dimethoxydibutoxysilane or the like.

Similar results can be obtained using a smaller amount of butanol if the methanol as a by-product in the above-described reaction is removed after the several hours' progress of the reaction. The above-cited ester exchange reaction is an equilibration reaction, and so the structure and the purity of the reaction product are determined depending on the mixing ratio between the starting materials used. According to this reaction, therefore, the intended product can be reproduced in high probability, and plural species of hydrolyzable groups can be introduced in an arbitrary ratio.

In addition to alcohols, other materials which can undergo the exchange reaction with alkoxy groups, such as carboxylic acids, oximes and the like, can also be used as starting materials for the ester exchange reaction.

In producing the organopolysiloxanes of the present invention from the thus prepared organoalkoxysilanes and/or organoalkoxysiloxanes, in which at least two different alkoxy groups per molecule are introduced, by taking advantage of a hydrolytic condensation reaction, known methods which have so far been used in the hydrolytic condensation of organoalkoxysilanes and siloxanes can be adopted. For instance, there can be employed a method such that organoalkoxysilanes and a hydrolytic condensation catalyst, and optionally a solvent such as toluene, xylene, methanol or so on, are placed in a reaction vessel and water is added thereto at a temperature of 0°–100° C. with stirring to proceed the reaction.

After the several hours' ageing, the hydrolytic condensation catalyst is removed from the reaction mixture by washing with water, neutralization or so on, thereby stopping the reaction. Further, the solvent is removed by distillation or so on. Thus, organopolysiloxanes as a solution having a desired concentration can be obtained.

In producing the present organopolysiloxanes, it is required for fully achieving the effect of the present invention that at least 50% by weight of the organoalkoxysilanes and/or organoalkoxysiloxanes used as starting materials be organoalkoxysilanes and/or organoalkoxysiloxanes containing in each molecule at least two different alkoxy groups.

In the production of methylpolysiloxanes having a number average molecular weight of 3,000, for example, it is difficult to control the degree of dispersion to below 3 when the total proportion of organoalkoxysilanes and organoalkoxysiloxanes containing in each molecule at least two different alkoxy groups is less than 50% by weight to all the organoalkoxysilanes and siloxanes used as starting materials, and the silanol content (in the methylpolysiloxanes as products, which are abbreviated as "resin" hereinafter) can only be raised up to about 4% by weight.

On the other hand, when the organoalkoxysilanes and organoalkoxysiloxanes containing in each molecule at least two different alkoxy groups are used in a total proportion of no less than 50% by weight, the degree of dispersion can be lowered to below 2.5 and the silanol content (in resin) can be changed to 10% by weight at the highest.

Specific examples of a catalyst for hydrolysis condensation which can be used in the aforesaid reaction include inorganic acids such as sulfuric acid, hydrochloric acid, phosphoric acid, etc., organic acids such as paratoluenesulfonic acid, oxalic acid, maleic acid, etc., inorganic bases such as sodium carbonate, KOH, NaOH, etc., organic bases such as ammonia, amines, ammonium hydroxide, etc., and organometallic compounds such as alkyl titanates, carboxylato iron complexes, organotin complexes, etc.

The average molecular weight of organopolysiloxanes obtained and the species and the contents of functional groups introduced therein are controlled by properly choosing the ratio between at least two different alkoxy groups contained in each molecule of the organoalkoxysilanes and the organoalkoxysiloxanes used as starting materials.

More specifically, since the alkoxy groups having a high hydrolysis rate participate mainly in formation of the polysiloxane skeleton through the hydrolytic condensation and most of alkoxy groups having a low hydrolysis rate remain as functional groups, the production of organopolysiloxanes having a high average molecular weight and a low content of alkoxy groups as functional groups becomes possible by choosing a small value as the ratio of the alkoxy groups having a low hydrolysis rate to the alkoxy groups having a high hydrolysis rate.

On the other hand, organopolysiloxanes having a low average molecular weight and a high content of alkoxy groups as functional groups can be obtained by choosing a large value as the ratio of the alkoxy groups having a low hydrolysis rate to the alkoxy groups having a high hydrolysis rate.

When the conventional methods are adopted in order to produce, for example, methylpolysiloxanes in a high reproducibility without accompanying microgel generation, the maximum of attainable number average molecular weights is about 3,000 and the minimum quantity of introducible alkoxy groups is about 2% by weight (to resin). In accordance with the present invention, on the other hand, the number average molecular weight can be raised up to around 6,000 and the quantity of alkoxy groups introduced can be lowered to below 1% by weight (to resin).

The species of functional groups can be arbitrarily set up by changing the species of slowly hydrolyzable alkoxy groups to be contained in organoalkoxysilanes and organoalkoxysiloxanes as starting materials.

Since the main gist of the present method, as described above, consists in the control of the ratio between the contents of hydrolyzable groups which hardly undergoes influences of reaction conditions, the same production result can be reproduced in high probability in accordance with the present invention.

In order to obtain organopolysiloxanes containing silanol groups as functional groups, it can serve for the purpose to hydrolyze the alkoxy groups remaining as functional groups in the organopolysiloxanes produced in accordance with the present method. The hydrolysis herein should be carried out under a mild condition such that the condensation reaction may hardly occur.

Accordingly, in the production of methylpolysiloxanes, the maximum quantity of silanol groups introduced is around 10% by weight (to resin) when the present method is used; while it is around 4% by weight (to resin) when the conventional methods are adopted. Such an advantage of the present method is due to high stability of the organopolysiloxanes obtained. This is consistent with a narrow distribution of molecular weights, or a low degree of dispersion, the organopolysiloxanes obtained by the present method have.

That is, the hydrolytic condensation in the present invention is carried out under a condition that groups having high hydrolysis rates undergo hydrolytic condensation but groups having low hydrolysis rates hardly undergo it. Therefore, not only the progress of local hydrolytic condensation is retarded, but also hydrolyzable groups remaining in the polymer component formed by hydrolytic condensation inhibit the polymer component from further undergoing the reaction to have higher molecular weight, because such hydrolyzable groups have low hydrolysis rate. As a result of it, polysiloxanes having a low degree of dispersion can be obtained.

In addition, as the hydrolysis rate difference is great between different species of hydrolyzable groups, it is easy to control the molecular weight by choosing the reaction condition, and so the degree of dispersion can be controlled to below 2.5 in the case of a number average molecular weight of 3,000 and high reproducibility can also be achieved.

In view of the arbitrary control of the dispersion degree alone, it is possible to use a mixture containing a silane having a plurality of alkoxy groups differing in hydrolysis rate and a silane having alkoxy groups of the same species in any ratio. From the standpoint of securing excellent properties as a room temperature curable resin, however, the proportion of a silane having alkoxy groups of the same species in the mixture is required to be less than 50% by weight.

Also, it is possible to introduce a plurality of alkoxy groups differing in hydrolysis rate into a silane molecule by mixing a silane having rapidly hydrolyzable alkoxy groups and a silane having slowly hydrolyzable alkoxy groups and forcing the mixture to undergo an ester exchange reaction before the hydrolytic condensation takes place to effect the redistribution of alkoxy groups.

The quantity of alkoxy groups capable of remaining in polysiloxanes produced in accordance with the method of present invention bears a close relation to the molecular structure of the polysiloxanes. In other words, once the average molecular weight, which is one of the indices for defining the molecular structure, is specified in case the silanes are used in a given ratio, the upper limit of the quantity of remaining alkoxy groups is determined. Accordingly, it is possible to control the quantity of remaining functional groups to any value so far as it is below the theoretical upper limit. According to the conventional methods, on the other hand, the quantity of functional groups capable of remaining in polysiloxanes can hardly be changed, and the upper limit thereof is lower than the upper limit achievable by the present method.

This is because the polysiloxanes obtained by hydrolytic condensation of trifunctional or tetrafunctional silanes can take any of molecular structures, including straight-chain, branched, ring and cage structures. More specifically, the remaining functional groups becomes less in quantity the larger the number of the ring structures in a molecule is. It is said in this connection that the number of ring structures contained in one molecule is 0 in straight-chain and branched structures, 1 in a ring structure, and at least 2 in a cage structure because a cage is regarded as a combination of a plurality of rings.

According to the conventional methods, the average number of ring structures contained in the polysiloxanes obtained is hardly changed depending on the reaction condition. This is supposed to be a reason why the changeable range of the quantity of functional groups is narrow in the conventional methods. In accordance with the present method, on the other hand, the quantity of functional groups can be changed in a wide range. In producing methylpolysiloxanes having a number average molecular weight of 3,000, for instance, although the proportion of silanol groups can be changed up to only around 4% by weight (to resin) according to the conventional methods, it can be changed up to around 10% by weight (to resin) in accordance with the present method.

This is because the number of ring structures in a polysiloxane molecular can be changed in the present method by changing the proportion of rapidly hydrolyzable alkoxy groups in a silane molecule through the introduction thereinto a plurality of alkoxy groups differing in hydrolysis rate, thereby enabling the control of the quantity of alkoxy groups remaining in the polysiloxane molecule. If the number of rapidly hydrolyzable alkoxy groups introduced in a silane molecule is two, the number of ring structures can be reduced to below 1. In such a case, the number of alkoxy groups remaining in the polysiloxanes produced can be made greater than those left in the polysiloxanes prepared from a silane having alkoxy groups of the same species alone and having the same average molecular weight as the present ones.

As the present method enable organopolysiloxanes to have a properly controlled average molecular weight and can ensure much room for choice in the kind and the quantity of curing functional groups, the organopolysiloxanes produced by the present method are of great utility as room temperature curable resin. In addition, the organopolysiloxane s produced may be used as they are, or the functional groups therein may be converted into other hydrolizable groups by ester exchange reaction.

After the preparation of organopolysiloxanes containing silanol groups, it is possible to further introduce the desired hydrolyzable groups thereinto by choosing an appropriate organosilane from those having two or more of hydrolyzable groups, such as an alkoxy group, a carboxyl group, an oxime group or so on, and reacting it with the silanol groups in the presence or absence of a catalyst. Thereby, the choice range of the kind and the quantity of curing functional groups can be further enlarged.

Further, not only the present method can inhibit the viscosity increase and gelation from occurring, although these phenomena are caused by the conventional methods upon introduction of hydrolyzable functional groups, but also the present method does not require to use a large excess of material for introduction of functional groups, e.g., an alcohol, a carboxylic acid, an oxime and an organosilane containing at least two hydrolyzable groups chosen from alkoxy groups, carboxyl groups, oxime groups and the like.

Moreover, the organopolysiloxanes obtained in accordance with the present method are suitable for the main material of a curable resin composition.

In using the organopolysiloxanes obtained herein as a curable resin composition, there can be added thereto various additives, such as a solvent, an adhesion improver, an ultraviolet absorbent, a storage stability improver, a plasticizer, a filler, a ageing inhibitor, a pigment, etc., depending upon the end-use purpose.

The present curable resin composition thus obtained is applied to various kinds of substrates in a conventional way, e.g., a way of spraying, coating with a brush, or so on, and then dried or baked at 0°–150° C. for 10–60 minutes. The thus formed resin films have excellent durability, weather resistance and water resistance. In particular, the present composition has no special restriction as to the curing condition because it can be cured by moisture in the air under room temperature, and so it can be used for various purposes.

As for the substrates to which the present composition can be applied, there can be instanced various kinds of metallic materials and processed goods thereof, wood, stone, slates, mortar, glass, ceramics, plastic products, tiles, organic resin-coated products and so on.

The present invention will now be illustrated in greater detail by reference to the following examples, but it should be understood that these examples are not to be construed as limiting the scope of the invention in any way.

1) PREPARATION OF ORGANOALKOXYSILANES AS STARTING MATERIAL

Preparation Examples 1 to 10

Raw materials in respective amounts as shown in Table 1 were placed in a one-liter flask equipped with a reflux condenser and installed in a distillation apparatus, and allowed to react with each other for 3 hours at 70° C. with stirring. Then, the methanol as a by-product and the alcohol remaining unreacted were removed by distillation under ordinary pressure. Thus, the intended organoalkoxysilane(s) were obtained. The yields of organoalkoxysilanes obtained are set forth in Table 1, too.

100 g of 1N of hydrochloric acid at 30° C. with stirring over a 1- hour period. Thereupon, the temperature of the reaction solution was raised up to 50° C. by the heat generating upon hydrolytic condensation.

After the 4-hour ageing, the reaction was stopped by washing the resulting solution with water. From the thus prepared toluene solution of organopolysiloxanes were

TABLE 1

| Preparation Example No. | Alkoxysilane Amount mixed (g) | Alcohol Amount mixed (g) | Exchange Reaction Catalyst Amount mixed (g) | Product 1 yield (%) | Product 2 yield (%) |
|---|---|---|---|---|---|
| 1 | MeSi (OMe)$_3$ 408 (3 moles) | Isobutyl Alcohol 148 (2 moles) | H$_2$SO$_4$ 2 | MeSi(OMe)$_2$(OBu) 50 | MeSi(OMe)(OBu)$_2$ 2 |
| 2 | MeSi (OMe)$_3$ 408 (3 moles) | Isobutyl Alcohol 296 (4 moles) | H$_2$SO$_4$ 2 | MeSi(OMe)$_2$(OBu) 80 | MeSi(OMe)(OBu)$_2$ 5 |
| 3 | MeSi (OMe)$_3$ 408 (3 moles) | Isobutyl Alcohol 444 (6 moles) | H$_2$SO$_4$ 2 | MeSi(OMe)$_2$(OBu) 50 | MeSi(OMe)(OBu)$_2$ 40 |
| 4 | MeSi (OMe)$_3$ 408 (3 moles) | Sec-butyl Alcohol 296 (4 moles) | H$_2$SO$_4$ 2 | MeSi(OMe)$_2$(OBu) 75 | MeSi(OMe)(OBu)$_2$ 3 |
| 5 | MeSi (OMe)$_3$ 408 (3 moles) | Tert-butyl Alcohol 296 (4 moles) | Ti(OPr)$_4$ 4 | MeSi(OMe)$_2$(OBu) 65 | MeSi(OMe)(OBu)$_2$ 1 |
| 6 | MeSi (OMe)$_3$ 408 (3 moles) | Isopropyl Alcohol 360 (6 moles) | CH$_3$SO$_3$H 2 | MeSi(OMe)$_2$(OPr) 40 | MeSi(OMe)(OPr)$_2$ 40 |
| 7 | Si (OMe)$_4$ 456 (3 moles) | Isopropyl Alcohol 360 (6 moles) | C$_6$H$_5$SO$_3$H 2 | Si(OMe)$_3$(OPr) 40 | Si(OMe)$_2$(OPr)$_2$ 50 |
| 8 | Si (OMe)$_4$ 456 (3 moles) | Hexyl Alcohol 408 (4 moles) | H$_2$NCH$_2$CH$_2$NH$_2$ 1 | Si(OMe)$_3$(OHex) 75 | Si(OMe)$_2$(OHex)$_2$ 1 |
| 9 | (MeO)$_3$SiOSi(OMe)$_3$ 387 (1.5 moles) | Isobutyl Alcohol 296 (4 moles) | Ti(OBu)$_4$ 4 | (MeO)$_2$(BuO)SiOSi(OMe)$_3$ 5 | (MeO)$_2$(BuO)SiOSi(OMe)$_2$(OBu) 70 |
| 10 | PhSi (OPr)$_3$ 564 (2 moles) | Methanol 128 (4 moles) | H$_2$SO$_4$ 2 | PhSi(OPr)$_2$(OMe) 40 | PhSi(OPr)(OMe)$_2$ 40 |
| 11 | MeSi (OMe)$_3$ 272 (2 moles) MeSi (OBu)$_3$ 262 (1 moles) | | H$_2$SO$_4$ 2 | MeSi(OMe)$_2$(OBu) 50 | MeSi(OMe)(OBu)$_2$ 20 |

In the foregoing Table 1, Me stands for a methyl group, Bu a butyl group, Pr a propyl group, Hex a hexyl group and Ph a phenyl group.

Preparation Example 11

Organoalkoxysilanes were prepared in the same manner as in Preparation Example 1, except that 272 g (2 moles) of methyltrimethoxysilane and 262 g (1 mole) of methyltriisopropoxysilane were used in place of 408 g (3 moles) of methyltrimethoxysilane as the raw material.

2) PRODUCTION OF ORGANOPOLYSILOXANES

Examples 1 to 11 and Comparative Example 1

The organoalkoxysilane mixtures in their respective amounts as shown in Table 2 were each placed in a one-liter flask together with 200 g of toluene, and thereto was dripped removed the alcohols, excess water and excess toluene by a distillation treatment so as to adjust the concentration of organopolysiloxanes in toluene to 50 wt %.

The organopolysiloxanes in each of the thus obtained solutions were examined for the number average molecular weight, the dispersion degree concerning the molecular weight distribution, the species and the contents of functional groups, and the stability.

Specifically, the number average molecular weight and the dispersion degree concerning the molecular weight distribution were determined by GPC measurements and expressed on a polystyrene-reduced basis.

The species and the content of functional groups were determined by the Si-NMR measurements, and the stability was evaluated by the time required for gelation in the promotion test at 50° C.

The evaluation results thus obtained are shown in Table 2.

TABLE 2

| No. | Organosilanes as Starting Material 1 Amount mixed (g) | Organosilane as Starting Material 2 Amount mixed (g) | Average Molecular Weight (Mn) | Degree of Dispersion (Mw/Mn) | Species of Functional Groups (Content: wt % to resin) | | Stability (days) |
|---|---|---|---|---|---|---|---|
| Example 1 | Product of Prepartion Example 1   300 | | 2500 | 2.0 | SiOH SiOBu | (1.0) (10) | 200< |
| Example 2 | Product of Prepartion Example 2   300 | | 2000 | 1.5 | SiOH SiOBu | (1.0) (18) | 200< |
| Example 3 | Product of Prepartion | | | | SiOH | (1.0) | |

TABLE 2-continued

| No. | Organosilanes as Starting Material 1 Amount mixed (g) | Organosilane as Starting Material 2 Amount mixed (g) | Average Molecular Weight (Mn) | Degree of Dispersion (Mw/Mn) | Species of Functional Groups (Content: wt % to resin) | | Stability (days) |
|---|---|---|---|---|---|---|---|
| Example 4 | Example 3 300 Product of Prepartion | | 1000 | 1.2 | SiOBu SiOH | (25) (1.0) | 200< |
| Example 5 | Example 4 300 Product of Prepartion | | 1500 | 1.4 | SiOBu SiOH | (20) (1.0) | 200< |
| Example 6 | Example 5 200 Product of Prepartion | Me₂Si(OMe)₂ 100 | 1200 | 1.4 | SiOBu SiOH | (22) (1.0) | 200< |
| Example 7 | Example 6 200 Product of Prepartion | PhSi(OMe)₃ 100 | 1300 | 1.4 | SiOPr SiOH | (8.0) (1.5) | 200< |
| Example 8 | Example 2 200 Product of Prepartion | Me₂Si(OMe)₂ 100 | 2000 | 1.8 | SiOBu SiOH | (12) (1.0) | 200< |
| Example 9 | Example 7 200 Product of Prepartion | Me₂Si(OMe)₃ 100 | 2500 | 2.2 | SiOPr SiOH | (6.0) (1.0) | 200< |
| Example 10 | Example 8 200 Product of Prepartion | Me₂Si(OPr)₃ 100 | 2200 | 1.7 | SiOHex SiOH | (20) (1.0) | 200< |
| Example 11 | Example 10 200 Product of Prepartion | | 1500 | 1.5 | SiOPr SiOH | (7.0) (1.0) | 200< |
| Comparative Example 1 | Example 11 300 Product of Prepartion Example 1 200 | MeSi(OMe)₃ 100 | 1100 2600 | 1.2 3.0 | SiOBu SiOH SiOBu | (20) (1.0) (10) | 200< 130 |

Examples 12 to 16

Each of the toluene solutions of organopolysiloxanes obtained before the distillation treatment in Examples 1 to 5 was admixed with acetone in such an amount that a 20 wt % solutions of organopolysiloxane s might be prepared in an amount of 400 g, and placed in a one-liter flask. Thereinto, 20 g of 0.01N hydrochloric acid was dripped at 20° C. with stirring over a 30 minute-period, followed by 4 hours' ageing. Then, the reaction was stopped by washing the resulting solution with water. From the thus prepared toluene/acetone solution of organopolysiloxanes were removed the water, excess toluene and excess acetone by a distillation treatment so as to adjust the concentration of organopolysiloxanes to 50 wt %.

The organopolysiloxanes in each of the thus obtained solutions were examined for the number average molecular weight, the dispersion degree concerning the molecular weight distribution, the species and the contents of functional groups, and the stability. The evaluation results thereof are shown in Table 3.

TABLE 3

| No. | Organosilane(s) as Starting Material 1 Amount mixed (g) | Organosilane as Starting Material 2 Amount mixed (g) | Average Molecular Weight (Mn) | Degree of Dispersion (Mw/Mn) | Species of Functional Groups (Content: wt % to resin) | | Stability (days) |
|---|---|---|---|---|---|---|---|
| Example 12 | Product of Example 1 400 (20% solution) | | 2700 | 2.2 | SiOH SiOBu | (3.0) (0.5) | 130 |
| Example 13 | Product of Example 2 400 (20% solution) | | 2100 | 1.7 | SiOH SiOBu | (5.0) (0.7) | 120 |
| Example 14 | Product of Example 3 400 (20% solution) | | 1100 | 1.3 | SiOH SiOBu | (8.0) (0.9) | 120 |
| Example 15 | Product of Example 4 400 (20% solution) | | 1600 | 1.5 | SiOH SiOBu | (5.5) (0.8) | 140 |
| Example 16 | Product of Example 5 400 (20% solution) | | 1300 | 1.5 | SiOH SiOBu | (6.0) (0.8) | 160 |
| Comparative Example 2 | MeSi(OMe)₂ 300 | | 1100 | 2.0 | SiOH SiOMe | (4.0) (7.0) | 100 |
| Comparative Example 3 | MeSi(OMe)₃ 300 | | 1500 | 2.5 | SiOH SiOMe | (4.0) (5.0) | 80 |
| Comparative Example 4 | MeSi(OMe)₂ 300 | | 3000 | 3.5 | SiOH SiOMe | (3.0) (3.0) | 50 |
| Comparative Example 5 | MeSi(OBu)₃ 300 | | 700 | 2.0 | SiOH SiOBu | (1.5) (30) | 150 |
| Comparative Example 6 | MeSi(OBu)₃ 300 | | 1000 | 2.0 | SiOH SiOPr | (1.0) (25) | 160 |
| Comparative Example 7 | MeSi(OBu)₃ 300 | | 1500 | 2.5 | SiOH SiOBu | (0.5) (20) | 130 |
| Comparative Example 8 | MeSi(OMe)₃ 190 | MeSi(OBu)₃ 183 | 2200 | 3.0 | SiOH SiOBu | (1.0) (19) | 80 |

Comparative Examples 2 to 4

Methyltrimethoxysilane in an amount of 272 g (2 moles) and toluene in an amount of 200 g were placed in a one-liter flask, and thereinto was dripped 100 g of 1N hydrochloric acid at 30° C. over a one-hour period with stirring. Thereafter, the ageing was carried out for 1 hour in Comparative Example 2, for 2 hours in Comparative Example 3, and for 4 hours in Comparative Example 4. Then, each reaction was stopped by washing the resulting solution with water. Thus, toluene solutions of organopolysiloxanes were obtained. They were each distilled to remove the water and excess toluene, thereby adjusting the concentration of organopolysiloxanes therein to 50 wt %.

The organopolysiloxanes in each of the thus obtained solutions were examined for the number average molecular weight, the dispersion degree concerning the molecular weight distribution, the species and the contents of functional groups, and the stability. The evaluation results thereof are also shown in Table 3.

Comparative Examples 5 to 7

Methylisobutoxysilane in an amount of 524 g (2 moles) was placed in a one-liter flask, and thereinto was dripped 100 g of 1N hydrochloric acid at 30° C. over a one-hour period with stirring. Thereafter, the ageing was carried out for 2 hours in Comparative Example 5, for 4 hours in Comparative Example 6, and for 8 hours in Comparative Example 7. Then, each reaction was stopped by washing the resulting solution with water. Thus, isobutyl alcohol solutions of organopolysiloxanes were obtained. They were each distilled to remove excess water and excess isobutyl alcohol, thereby adjusting the concentration of organopolysiloxanes therein to 50 wt %.

The organopolysiloxanes in each of the thus obtained solutions were examined for the number average molecular weight, the dispersion degree concerning the molecular weight distribution, the species and the contents of functional groups, and the stability. The evaluation results thereof are also shown in Table 3.

Comparative Example 8

A toluene solution of organopolysiloxanes was obtained in the same manner as in Example 1, except that 190 g (1.4 moles) of methyltrimethoxysilane and 183 g (0.07 mole) of methyltriisobutoxysilane were used in place of the organoalkoxysilanes of Example 1. The organopolysiloxanes in the thus obtained solution were examined for the number average molecular weight, the dispersion degree concerning the molecular weight distribution, the species and the contents of functional groups, and the stability. The evaluation results thereof are also shown in Table 3.

3) PRODUCTION OF ORGANOPOLYSILOXANES FOR ROOM TEMPERATURE CURABLE RESIN

Examples 17 to 26

In a one-liter flask under a dry nitrogen flow, each of the solutions of organopolysiloxanes obtained in Examples 1 to 6 and Examples 12 to 15 and a hydrolyzable group-containing silane as shown in Table 4 were placed in their respective proportions as set forth in Table 4, and mixed with each other at 20° C. for 2 hours with stirring.

The organopolysiloxanes in each of the thus obtained solutions were examined for the number average molecular weight, the dispersion degree concerning the molecular weight distribution, and the stability. The evaluation results thereof are shown in Table 4.

TABLE 4

| No. | Starting Material for Organopolysiloxanes Amount mixed (g) | Hydralyzable Group Containing Silane Amount mixed (g) | Average Molecular Weight (Mn) | Degree of Dispersion (Mw/Mn) | Stability (days) |
| --- | --- | --- | --- | --- | --- |
| Example 17 | Product of Example 12 300 | MeSi(ONC(CH$_3$)(C$_2$H$_5$))$_3$ 100 | 2900 | 2.4 | 50< |
| Example 18 | Product of Example 12 300 | MeSi(ONC(CH$_3$)(C$_2$H$_5$))$_3$ 100 | 2900 | 2.4 | 40 |
| Example 19 | Product of Example 13 300 | MeSi(ONC(CH$_3$)(C$_2$H$_5$))$_3$ 50 | 3000 | 2.5 | 50< |
| Example 20 | Product of Example 13 300 | MeSi(ONC(CH$_3$)(C$_2$H$_5$))$_3$ 100 | 2400 | 1.9 | 50< |
| Example 21 | Product of Example 13 300 | MeSi(OC(CH$_3$)=CH$_2$)$_3$ 100 | 2200 | 1.8 | 10 |
| Example 22 | Product of Example 13 300 | MeSi(OCOCH$_3$)$_3$ 100 | 3000 | 2.7 | 20 |
| Example 23 | Product of Example 14 300 | MeSi(ONC(CH$_3$)(C$_2$H$_5$))$_3$ 150 | 2800 | 2.6 | 40 |
| Example 24 | Product of Example 15 300 | MeSi(OC(CH$_3$)=CH$_2$)$_3$ 100 | 2000 | 2.0 | 10 |
| Example 25 | Product of Example 1 300 | MeSi(ONC(CH$_3$)(C$_2$H$_5$))$_3$ 50 | 2900 | 2.7 | 50< |
| Example 26 | Product of Example 6 300 | MeSi(ONC(CH$_3$)(C$_2$H$_5$))$_3$ 50 | 1300 | 2.1 | 50< |

Comparative Examples 9 to 14

In a one-liter flask under a dry nitrogen flow, each of the solutions of organopolysiloxanes obtained in Comparative Examples 2 to 4 and a hydrolyzable group-containing silane as shown in Table 5 were placed in their respective proportions as set forth in Table 5, and mixed with each other at 20° C. for 2 hours with stirring.

The organopolysiloxanes in each of the thus obtained solutions were examined for the number average molecular weight, the dispersion degree concerning the molecular weight distribution, and the stability. The evaluation results thereof are shown in Table 5.

TABLE 5

| No. | Starting Material for Organopolysiloxanes Amount mixed (g) | Hydralyzable Group Containing Silane Amount mixed (g) | Average Molecular Weight (Mn) | Degree of Dispersion (Mw/Mn) | Stability (days) |
|---|---|---|---|---|---|
| Comparative Example 9 | Product of Prepartion Example 1  300 | $MeSi(ONC(CH_3)(C_2H_5))_3$ 100 | gelation during reaction | | |
| Comparative Example 10 | Product of Prepartion Example 2  300 | $MeSi(ONC(CH_3)(C_2H_5))_3$ 50 | gelation during reaction | | |
| Comparative Example 11 | Product of Prepartion Example 2  300 | $MeSi(ONC(CH_3)(C_2H_5))_3$ 50 | 3000 | 3.3 | 20 |
| Comparative Example 12 | Product of Prepartion Example 2  300 | $MeSi(ONC(CH_3)(C_2H_5))_3$ 50 | 2000 | 2.9 | 30 |
| Comparative Example 13 | Product of Prepartion Example 2  300 | $MeSi(OC(CH_3)=CH_2)_3$ 100 | gelation during reaction | | |
| Comparative Example 14 | Product of Prepartion Example 3  300 | $MeSi(ONC(CH_3)(C_2H_5))_3$ 100 | 3500 | 3.7 | 10 |

4) EVALUATION OF CLEAR FILM CHARACTERISTICS OF ORGANOPOLYSILOXANES FOR ROOM TEMPERATURE CURABLE RESIN

TABLE 6

| No. | Organopolysiloxanes | Appearance | Dryability (minutes) | Hardness | Adhesion |
|---|---|---|---|---|---|
| Example 27 | Product of Example 17 | ○ | 60 | 4H | ○ |
| Example 28 | Product of Example 18 | ○ | 30 | 4H | ○ |
| Example 29 | Product of Example 19 | ○ | 60 | 4H | ○ |
| Example 30 | Product of Example 20 | ○ | 60 | 4H | ○ |
| Example 31 | Product of Example 21 | ○ | 10 | 5H | ○ |
| Example 32 | Product of Example 22 | ○ | 20 | 4H | ○ |
| Example 33 | Product of Example 23 | ○ | 30 | 4H | ○ |
| Example 34 | Product of Example 24 | ○ | 10 | 5H | ○ |
| Example 35 | Product of Example 25 | ○ | 60 | 3H | ○ |
| Example 36 | Product of Example 26 | ○ | 60 | 3H | ○ |
| Comparative Example 15 | Product of Comparative Example 11 | X | 90 | 3H | Δ |
| Comparative Example 16 | Product of Comparative Example 12 | Δ | 120 | 3H | ○ |
| Comparative Example 17 | Product of Comparative Example 14 | Δ | 120 | 3H | X |

Examples 27 to 36

Each of the solutions of organopolysiloxanes for room temperature curable resin obtained in Examples 17 to 26 was applied to a polished steel plate surface by means of a bar coater No. 36, and cured at 25° C. for 3 days to convert into a clear film having a thickness of 20 μm. Film characteristics were evaluated by the following methods:

Appearance: The appearance of each film was ascertained by visual observation. A transparent, glossy, even and uniform film was denoted by a mark ○, a cloudy or turbid film by a mark Δ, and a film suffering filming troubles such as generation of fine roughness, pinholes and so on by a mark X.

Hardness: The hardness of each film was examined by a pencil hardness test.

Dryability: The dryability of each film was evaluated by the time required of the film to lose its tackiness.

Adhesion: The adhesion of each film was evaluated by a cross-cut (10×10) adhesion test. A peeling-free film was denoted by a mark ○, a film having caused peeling in a less than half area thereof by a mark Δ, and a film haing caused peeling in a more than half area thereof by a mark X.

The evaluation results obtained are shown in Table 6.

Comparative Examples 15 to 17

Each of the solutions of organopolysiloxanes as room temperature curable resin obtained in Comparative Examples 11, 12 and 14 was evaluated by the same methods as adopted in Example 27. The evaluation results obtained are also shown in the foregoing Table 6.

It is therefore concluded that the effectiveness of the present invention has been proved by the results illustrated above.

What is claimed is:

1. A method of producing a curable resin composition containing as the main component an organopolysiloxane having hydrolyzable functional groups, said method comprising:

a) producing an organopolysiloxane by hydrolytic condensation of organoalkoxysilanes and/or organoalkoxysiloxanes in the presence of water and a hydrolysis catalyst, wherein at least 50% by weight of said organoalkoxysilanes and/or organoalkoxysiloxanes are represented by an average compositional formula (A):

$$R^1{}_a SiX_b Y_c O_{(4-a-b-c)/2} \qquad (A)$$

wherein each $R^1$ independently represents an unsubstituted alkyl, alkenyl or aryl group or chloro, fluoro, glycidyl, amino, mercaptyl, methacryloxy or acryloxy, substituted alkyl, alkenyl or aryl group;

X represents an alkoxy group containing 1–10 carbon atoms;

Y represents an alkoxy group containing 2–10 carbon atoms which is different from the alkoxy group represented by X, has a hydrolysis rate lower than that of X and appears on the same silicon atom as X;

a is a real number of from 0 to 2;

b and c are each a real number from 0.1 to 3, provided that a+b+c is $\leq 4$;

said organopolysiloxane containing silanol groups and alkoxy groups represented by Y and having a degree of dispersion, Mw/Mn, below 2.5, wherein Mw is weight average molecular weight and Mn is number average molecular weight; and (b) subjecting said organopolysiloxane produced to an ester exchange reaction and a hydrolytic condensation reaction, in the presence or absence of a catalyst, with an organosilane containing at least two hydrolyzable functional groups to introduce hydrolyzable functional groups to said organopolysiloxane, wherein the ester exchange takes place between silanol groups in said organopolysiloxane and hydrolyzable functional groups in said organosilane as well as between unhydrolyzed alkoxy groups remaining in the organopolysiloxane and hydrolyzable functional groups in said organosilane.

2. A method of claim 1, wherein at least 50% by weight of the organoalkoxysilanes and/or organoalkoxysilanes used for the hydrolytic condensation reaction in step (a) comprise organotrialkoxysilanes having b+c=3 in formula A, organotetraalkoxysilanes having b+c=4 in formula A or a combination thereof.

3. A method of claim 1, wherein the alkoxy groups of the organopolysiloxane produced in step (a), represented by Y, are partially hydrolyzed prior to step (b).

4. A method as in claim 1, wherein X is an alkoxy group chosen from a group consisting of methoxy, ethoxy and propoxy groups and Y is an alkoxy group different from X which is chosen from a group consisting of propoxy, isopropoxy, butoxy, tert-butoxy, pentanoxy and hexanoxy groups.

5. A method as in claim 1, wherein the organoalkoxysilanes and/or organoalkoxysiloxanes represented by the average compositional formula (A) are two or more of the compounds selected from a group consisting of $Si(OC_3H_7)(OCH_3)_3$, $Si(OC_3H_7)_2(OCH_3)_2$, $Si(OC_4H_9)(OCH_3)_3$, $Si(OC_4H_9)_2(OCH_3)_2$, $Si(OC_3H_7)(OC_2H_5)_3$, $Si(OC_3H_7)_2(OC_2H_5)_2$, $Si(OC_4H_9)(OC_2H_5)_3$, $Si(OC_4H_9)_2(OC_2H_5)_2$, $(CH_3O)_2(C_3H_7O)SiOSi(OCH_3)_2(OC_3H_7)$, $(CH_3O)(C_3H_7O)_2SiOSi(OCH_3)(OC_3H_7)_2$, $(CH_3O)_2(C_3H_7O)SiOSi(OCH_3)(OC_3H_7)OSi(OC_4H_9)(OCH_3)_2$, $(CH_3)Si(OC_3H_7)(OCH_3)_2$, $(CH_3)Si(OC_3H_7)_2(OCH_3)$, $(CH_3)Si(OC_4H_9)(OCH_3)_2$, $(CH_3)Si(OC_4H_9)_2(OCH_3)$, $(CH_3)Si(OC_3H_7)(OCH_3)O(CH_3)Si(OC_3H_7)(OCH_3)$, $(CH_3)Si(OCH_3)(OC_3H_7)O(CH_3)Si(OC_3H_7)(OCH_3)Si(OCH_3)(OC_3H_7)$, $(CH_3)Si(OCH_3)(OC_4H_9)O(CH_3)Si(OCH_3)O(CH_3)Si(OCH_3)(OC_4H_9)$, $(CH_3)_2Si(OCH_3)(OC_3H_7)$, $(CH_3)_2Si(OCH_3)(OC_4H_9)$, $(C_6H_5)Si(OC_3H_7)(OCH_3)_2$, $(C_6H_5)Si(OC_4H_9)(OCH_3)_2$, $(C_6H_5)Si(OC_3H_7)(OCH_3)O(C_6H_5)Si(OC_3H_7)(OCH_3)$ and $(C_6H_5)Si(OC_3H_7)(OCH_3)O(C_6H_5)Si(OCH_3)O(C_6H_5)Si(OC_3H_7)(OCH_3)$.

6. A method as in claim 1, wherein the ester exchange reaction is carried out in the presence of a catalyst chosen from a group consisting of hydrochloric acid, sulfuric acid, phosphoric acid, paratoluenesulfonic acid, trifluoroacetic acid, NaOH, KOH, amines, ammonium hydroxide, alkyl titanates and organotin complexes.

7. A method as in claim 1, wherein the hydrolyzable groups of the organosilane are alkoxy groups, carboxyl groups and/or oxime groups.

8. A method as in claim 1, wherein the catalyst is a compound chosen from the group consisting of sulfuric acid, hydrochloric acid, phosphoric acid, paratoluenesulfonic acid, oxalic acid, maleic acid, sodium carbonate, KOH, NaOH, ammonia, amines, ammonium hydroxide, alkyl titanates, carboxylato iron complexes and organotin complexes.

* * * * *